United States Patent
Scriven et al.

(10) Patent No.: US 11,281,999 B2
(45) Date of Patent: Mar. 22, 2022

(54) PREDICTIVE ACCURACY OF CLASSIFIERS USING BALANCED TRAINING SETS

(71) Applicant: International Business Machines Corporation, Armonk, NY (US)

(72) Inventors: Gerhardt Jacobus Scriven, Indaiatuba (BR); Kartik Narayanaswamy, Bangalore (IN); Venkatesh Halappa, Bangalore (IN); Naganarasimha Subraveshti Vijayanarasimha, Bangalore (IN)

(73) Assignee: International Business Machines Corporation Armonk, New York, New York, NY (US)

( * ) Notice: Subject to any disclaimer, the term of this patent is extended or adjusted under 35 U.S.C. 154(b) by 420 days.

(21) Appl. No.: 16/411,425

(22) Filed: May 14, 2019

(65) Prior Publication Data
US 2020/0364609 A1    Nov. 19, 2020

(51) Int. Cl.
*G06F 17/00* (2019.01)
*G06N 20/00* (2019.01)
*G06F 40/40* (2020.01)

(52) U.S. Cl.
CPC ............ *G06N 20/00* (2019.01); *G06F 40/40* (2020.01)

(58) Field of Classification Search
CPC ...... G06N 20/00; G06N 7/005; G06K 9/6278; G06K 9/6256; G06F 16/35; G06F 40/40
See application file for complete search history.

(56) References Cited

U.S. PATENT DOCUMENTS

| | | | |
|---|---|---|---|
| 6,182,058 B1 | 1/2001 | Kohavi | |
| 8,392,153 B2* | 3/2013 | Pednault | G06F 16/2465 703/2 |
| 9,582,490 B2* | 2/2017 | Simard | G06F 40/242 |
| 9,798,982 B2* | 10/2017 | Lin | G06N 20/00 |
| 10,783,801 B1* | 9/2020 | Beaubien | A61B 5/0245 |

(Continued)

FOREIGN PATENT DOCUMENTS

WO    2015194052 A1    12/2015

OTHER PUBLICATIONS

Bhowan, Urvesh, et al, "Developing New Fitness Functions in Genetic Programming for Classification With Unbalanced Data," IEEE Transactions on Systems, Man, and Cybernetics—Part B: Cybernetics, vol. 42, No. 2, Apr. 2012, pp. 406-421. (Year: 2012).*

(Continued)

*Primary Examiner* — Laurie A Ries
(74) *Attorney, Agent, or Firm* — Randy E. Tejeda

(57) ABSTRACT

In an approach to improving the predictive accuracy of classifiers, one or more computer processors calculate one or more training set statistics. The one or more computer processors generate one or more balanced training sets based on one or more calculated training set statistics. The one or more computer processors train one or more cognitive models utilizing one or more unbalanced training sets and one or more generated balanced training sets. The one or more computer processors determine a fitness of the one or more trained cognitive models. The one or more computer processors adjust one or more training sets based on the determined fitness of the one or more cognitive models.

20 Claims, 9 Drawing Sheets

(56) References Cited

U.S. PATENT DOCUMENTS

| | | | |
|---|---|---|---|
| 2006/0069678 A1 | 3/2006 | Chou | |
| 2013/0097103 A1* | 4/2013 | Chari | G06N 20/00 706/12 |
| 2015/0186800 A1* | 7/2015 | Kaplow | G06N 20/00 706/12 |
| 2017/0132362 A1 | 5/2017 | Skinner | |
| 2017/0337487 A1* | 11/2017 | Nock | G06N 3/08 |
| 2018/0032900 A1 | 2/2018 | Chowdhury | |
| 2018/0268258 A1* | 9/2018 | Tapia | G06K 9/6262 |
| 2020/0045063 A1* | 2/2020 | Zhang | G06N 3/08 |
| 2020/0175390 A1* | 6/2020 | Conti | G06F 40/237 |
| 2020/0250508 A1* | 8/2020 | De Magalhaes | G16H 10/60 |
| 2020/0293617 A1* | 9/2020 | Luo | G06F 8/73 |
| 2020/0356855 A1* | 11/2020 | Yeh | G06F 40/30 |

OTHER PUBLICATIONS

Guo et al., "On the Class Imbalance Problem", Fourth International Conference on Natural Computation, © 2008 IEEE, DDOI 10.109/ICNC.2208.871, 10 pages, <https://sci2s.ugr.es/keel/pdf/specific/congreso/guo_on_2008.pdf>.

Krawczyk, Bartosz, "Learning from imbalanced data: open challenges and future directions", Prog Artif Intell (2016) 5:221-232, DOI 10.1007/s13748-016-0094-0, Received: Jan. 5, 2016 / Accepted: Apr. 11, 2016 / Published online: Apr. 22, 2016, © The Author(s) 2016. This article is published with open access at Springerlink.com, 12pages, <https://link.springer.com/article/10.1007/s13748-016-0094-0>.

\* cited by examiner

PREDICTIVE ACCURACY OF CLASSIFIERS USING BALANCED TRAINING SETS

BACKGROUND

The present invention relates generally to the field of natural language classifiers and more particularly to the improvement of predictive accuracy of Naïve-Bayes classifiers.

In probability theory and statistics, Bayes' theorem (alternatively Bayes' law or Bayes' rule) describes the probability of an event, based on prior knowledge of conditions that might be related to the event. One of the many applications of Bayes' theorem is Bayesian inference, an approach to statistical inference. When applied, the probabilities involved in Bayes' theorem may have different probability interpretations. With the Bayesian probability interpretation, the theorem expresses how a degree of belief, expressed as a probability, should rationally change to account for availability of related evidence. Bayesian inference is fundamental to Bayesian statistics.

In machine learning, Naïve Bayes classifiers are a family of simple probabilistic classifiers based on applying Bayes' theorem with strong (Naïve) independence assumptions between the features. Naïve Bayes classifiers are highly scalable, requiring a number of parameters linear in the number of variables (features/predictors) in a learning problem. Naïve Bayes is a simple technique for constructing classifiers: models that assign class labels to problem instances, represented as vectors of feature values, where the class labels are drawn from some finite set. There is not a single algorithm for training such classifiers, but a family of algorithms based on a common principle: all Naïve Bayes classifiers assume that the value of a feature is independent of the value of any other feature, given the class variable. For some types of probability models, Naïve Bayes classifiers can be trained very efficiently in a supervised learning setting.

SUMMARY

Embodiments of the present invention disclose a method, a computer program product, and a system for improving the predictive accuracy of classifiers. The method includes one or more computer processors calculating one or more training set statistics. The one or more computer processors generate one or more balanced training sets based on one or more calculated training set statistics. The one or more computer processors train one or more cognitive models utilizing one or more unbalanced training sets and one or more generated balanced training sets. The one or more computer processors determine a fitness of the one or more trained cognitive models. The one or more computer processors adjust one or more training sets based on the determined fitness of the one or more cognitive models.

DETAILED DESCRIPTION

Naïve Bayes is one of the most popular natural language classifiers due to the level of accuracy that can be obtained with relatively small amounts of training. In practice, however, Naïve Bayes is sensitive to differences in the number and quantity of training statements that are attributed or associated to one or more labels. If there is a large imbalance, in that one label has a significantly large number of training statements compared to another, the classification will be skewed, potentially resulting in misclassifications or a reduction in accuracy. In many real world scenarios or applications, different classes or labels require differing amounts of training statements in order to have an accurate and reliable model. For example, a leaf of grass may require only a handful of training statements for a classifier to be able to identify leaves of grass but a tree may require substantially more training statements for a classifier to identify trees. Classification algorithms, such as Naïve Bayes classifiers, do not account for the distribution of training statements for each class. Furthermore, said algorithms do not balance or distribute classes and associated training statements.

Embodiments of the present invention allow for significantly increased classification accuracy without modifying the algorithm and without reducing or removing training statements by determining a lowest common multiple for each class and replicating training statement associated with each label utilizing the determined lowest common multiple. In an embodiment of the present invention, Naïve Bayes training statements are balanced based on a determined lowest common multiple resulting in higher confidence levels in classifying known entities and flattens out the certainty distribution for inputs that the classifier is not trained to classify. Implementation of embodiments of the invention may take a variety of forms, and exemplary implementation details are discussed subsequently with reference to the Figures.

The present invention will now be described in detail with reference to the Figures.

Figure 1:
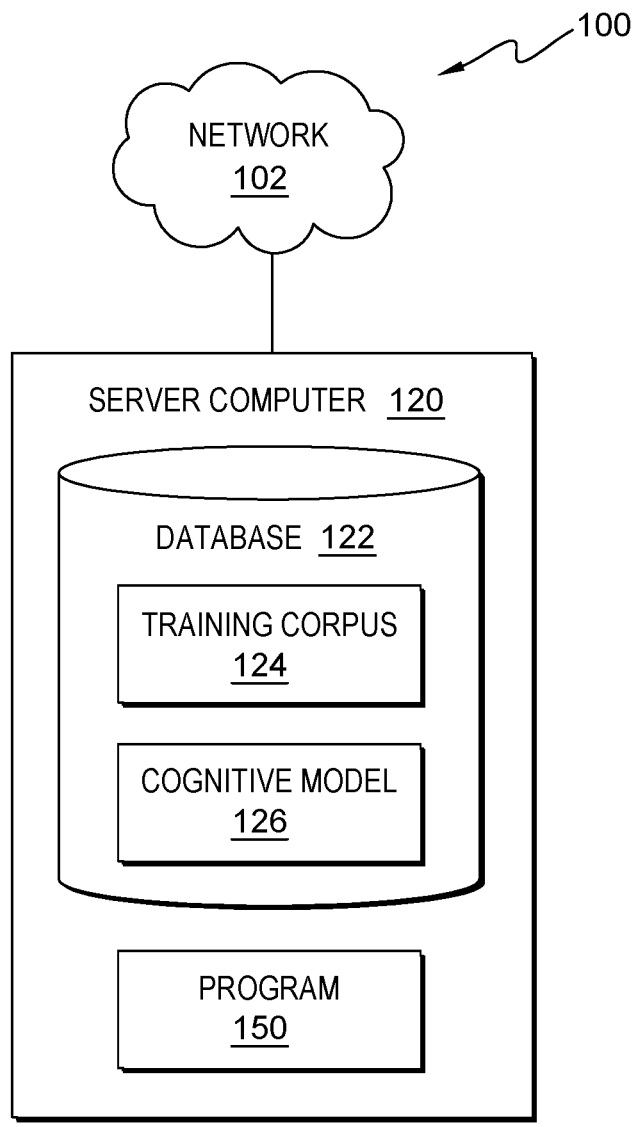
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 9.

Database 122 is a repository for data used by program 150. In the depicted embodiment, database 122 resides on server computer 120. In another embodiment, database 122 may reside on a plurality of client computing device (not depicted) or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as training sets, label distribution data and charts, and historical model accuracy and performance statistics. In the depicted embodiment, database 122 contains training corpus 124 and cognitive model 126.

Figure 3:
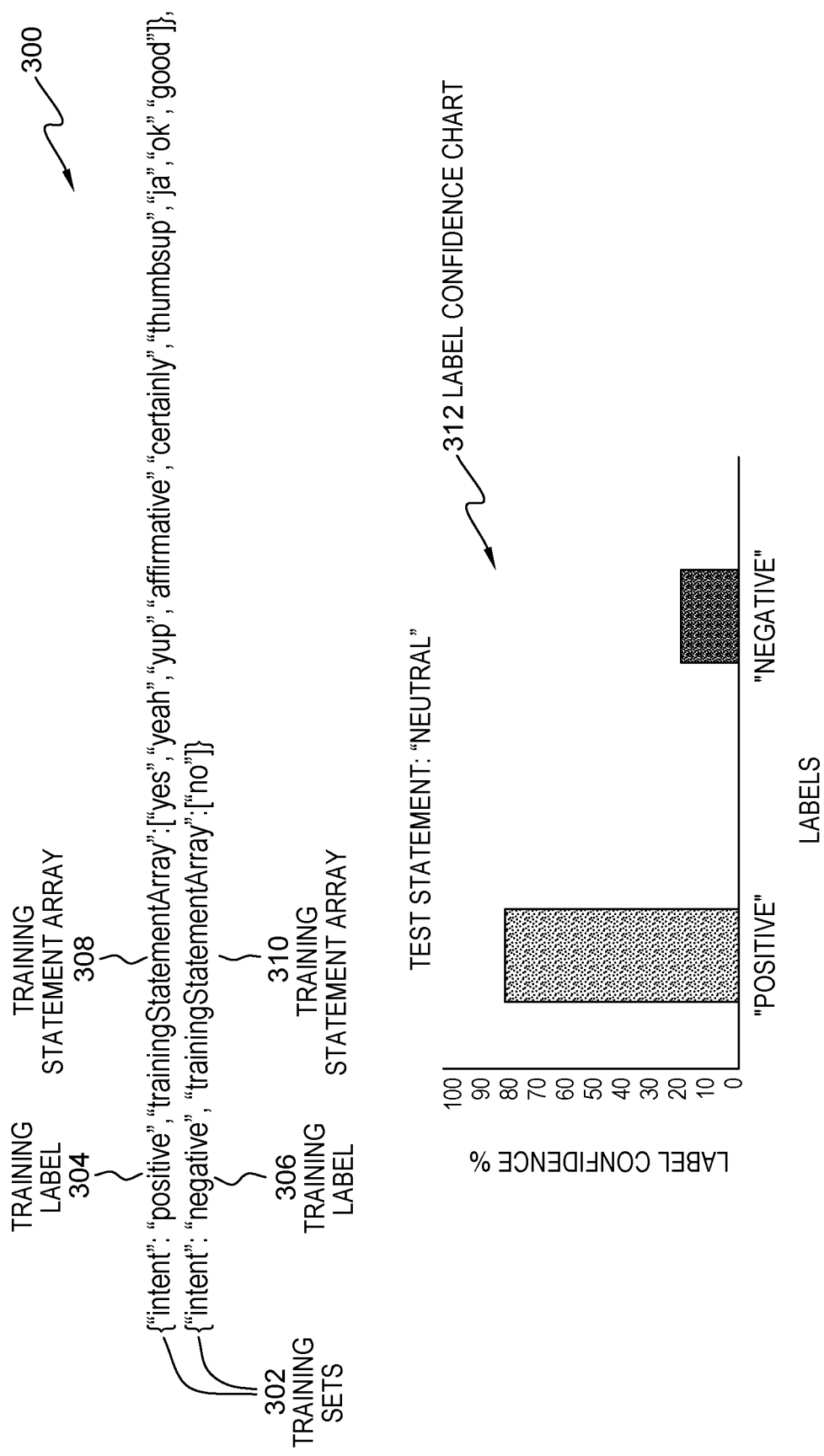
FIG. 3 is an example embodiment of the steps of flowchart 200, in accordance with an embodiment of the present invention.

Training corpus 124 may contain one or more sets of one or more instances of classified (e.g., labelled) data, hereinafter referred to as training statements. FIG. 3 depicts an example training set containing an array of training statements organized in labelled training sets. In FIG. 3, the training sets include "positive" and "negative" labels with associated training statements (e.g., words). In an embodiment, each training set includes a label and an associated array or set of training statements which can be utilized to train one or more models. In a further embodiment, training corpus 124 contains vectorized (i.e., one-hot encoding, word embedded, dimension reduced, etc.) training sets and associated training statements.

Cognitive model 126 utilizes one or more cognitive models to classify one or more problem instances (e.g., natural language statements, test statements, etc.). In the depicted embodiment, cognitive model 126 utilizes a Naïve Bayes model trained utilizing supervised training methods. In this embodiment, cognitive model 126 classifies a problem instance (e.g., testing statements, word or statement that needs classification (e.g., positive, neutral, negative, etc.), etc.) by considering different features, available as structured or unstructured data and utilizing Maximum Likelihood or Maximum A-Posteriori techniques. Program 150 feeds a vectorized training set of feature data to cognitive model 126. In various embodiments, the features are labelled with an associated class enabling cognitive model 126 to learn what features are correlated to a specific class, prior to use. Cognitive model 126 is trained to recognize the differences between labels or classes. Cognitive model 126 utilizes training sets to generate a set of probabilities denoting the probability of a problem instance belonging to a particular label or class. The training of cognitive model 126 is depicted and described in further detail with respect to FIG. 2.

Program 150 is a program for improving the predictive accuracy of classifiers. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. Program 150 is depicted and described in further detail with respect to FIG. 2.

The present invention may contain various accessible data sources, such as database 122, that may include personal storage devices and content the user wishes not to be used, program 150 allows the user to opt in or opt out of exposing personal information. Program 150 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Figure 2:
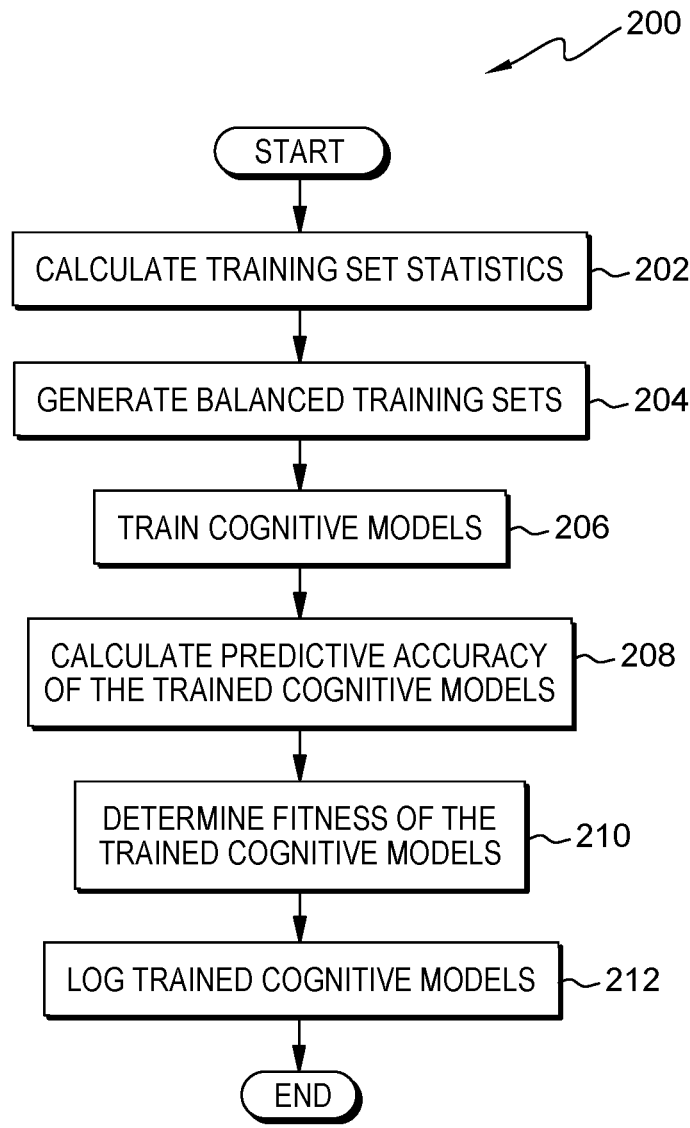
FIG. 2 is a flowchart depicting operational steps of a training statement distribution program, on a server computer within the computational environment of FIG. 1, for improving the predictive accuracy of classifiers, in accordance with an embodiment of the present invention.

FIG. 2 is a flowchart depicting operational steps of program 150 improving the predictive accuracy of classifiers, in accordance with an embodiment of the present invention.

Program 150 calculates training set statistics (step 202). In an embodiment, program 150 initiates when the training of a model is detected. In another embodiment, program 150 initiates based on a user interaction. For example, the user transmits an initiation notification to program 150. In an embodiment, program 150 retrieves one or more training sets from training corpus 124. In another embodiment, program 150 contains one or more training sets. In yet another embodiment, the user inputs one or more training sets into program 150. In the depicted embodiment, program 150 retrieves training sets that include "positive" and "negative" labels with associated arrays of associated training data (e.g., words associated with a positive response or a negative response). As program 150 detects, receives, or retrieves one or more training sets, program 150 calculates training set statistics for each training set. In an embodiment, training set statistics may include, but are not limited to, total training statements, total training labels, frequency of training statements associated with each training label, global training statement ratio (e.g., training statement lowest common multiple) based on the frequency of training statements associated with each training label, and sets containing training statement ratios for each training label paired with another training label (e.g., label to label training statement ratios). In this embodiment, the lowest common multiple denotes a value where said value when applied to an underrepresented label equalizes the respective associated training statements. For example, in FIG. 3, the training set containing the "positive" intent label has nine associated training statements and the training set containing the "negative" intent label has one associated training statement. In this example, program 150 calculates the total statements and a training statement ratio of nine based on the training statements associated with the "positive" and "negative" labels. In various embodiments, program 150 utilizes the following algorithm to calculate training statement ratios for every training. In the following algorithm, the variable "CD" denotes a numeric training statement ratio (e.g., lowest common multiple), variable "i" denotes an index value for a specific label, variable "n_i" denotes the number of training statement for a specific label, and "MOD" denotes a modulus function.

```
Set CD = 1
For Each Label (i)
  n_i = number of training statements
  If CD MOD n_i > 0
    CD = CD * n_i
```

Said algorithm calculates a ratio or multiplier that when applied to the training statements of said label balances the training set.

Program 150 generates balanced training sets (step 204). Program 150 utilizes the training set statistics, detailed in step 202, to create one or more balanced sets or balanced subsets of the one or more retrieved training sets. For example, as detailed in FIG. 3, program 150 may retrieve training sets, such as training sets 302, which may include the label "positive" and the following associated training statements ["yes", "yeah", "yup", "affirmative", "certainly", "thumbsup", "ja", "ok", "good"] and include the label "negative" includes the following associated statement ["no"]. Program 150 utilizes the training statements counts and ratios calculated in step 202 to determine the balanced training statement ratios (e.g., lowest common multiple) for each training label. Continuing from the example above, the "positive" label contains nine training statements while the "negative" label contains one training statement.

Figure 5:
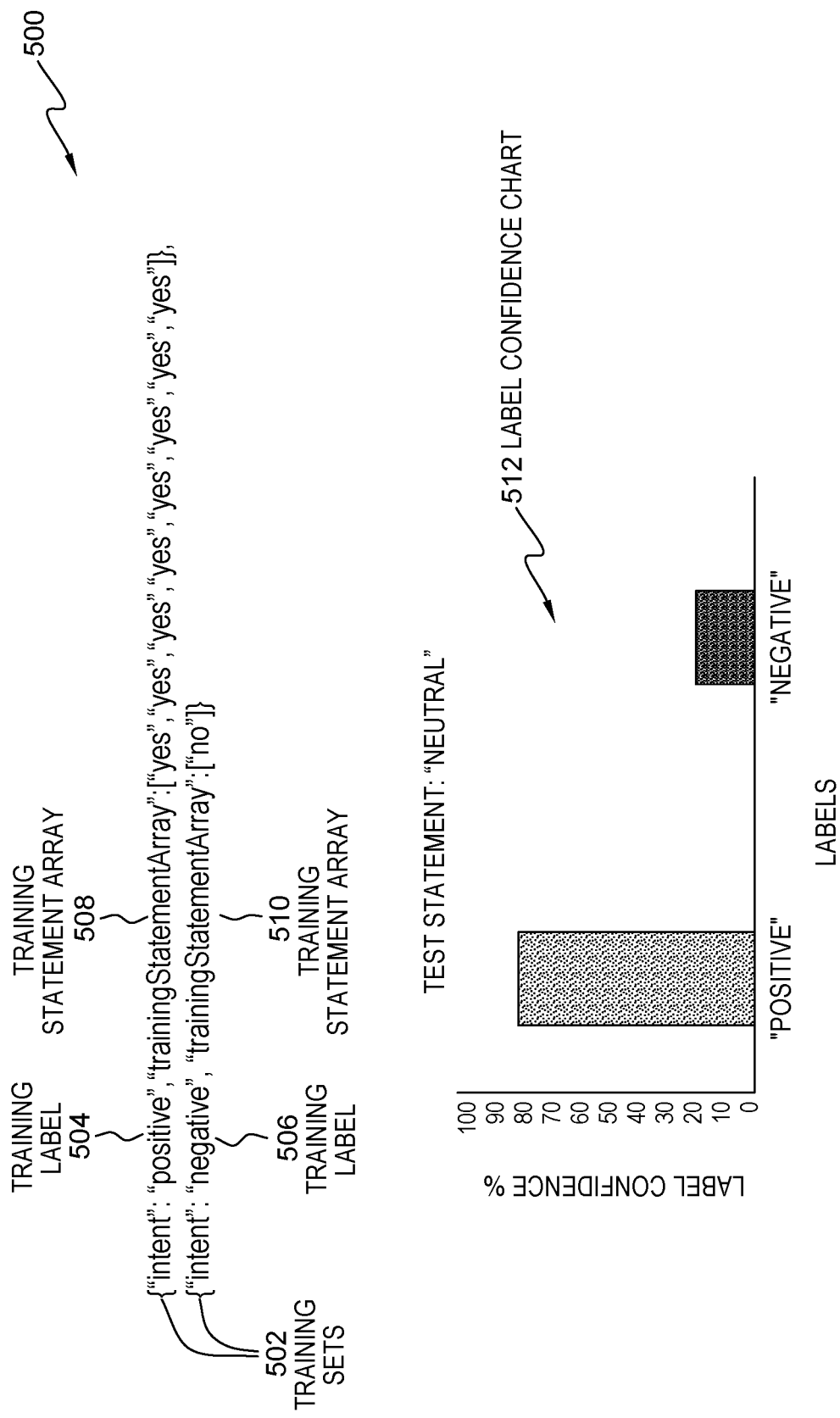
FIG. 5 is an example embodiment of the steps of flowchart 200, in accordance with an embodiment of the present invention.
Figure 6:
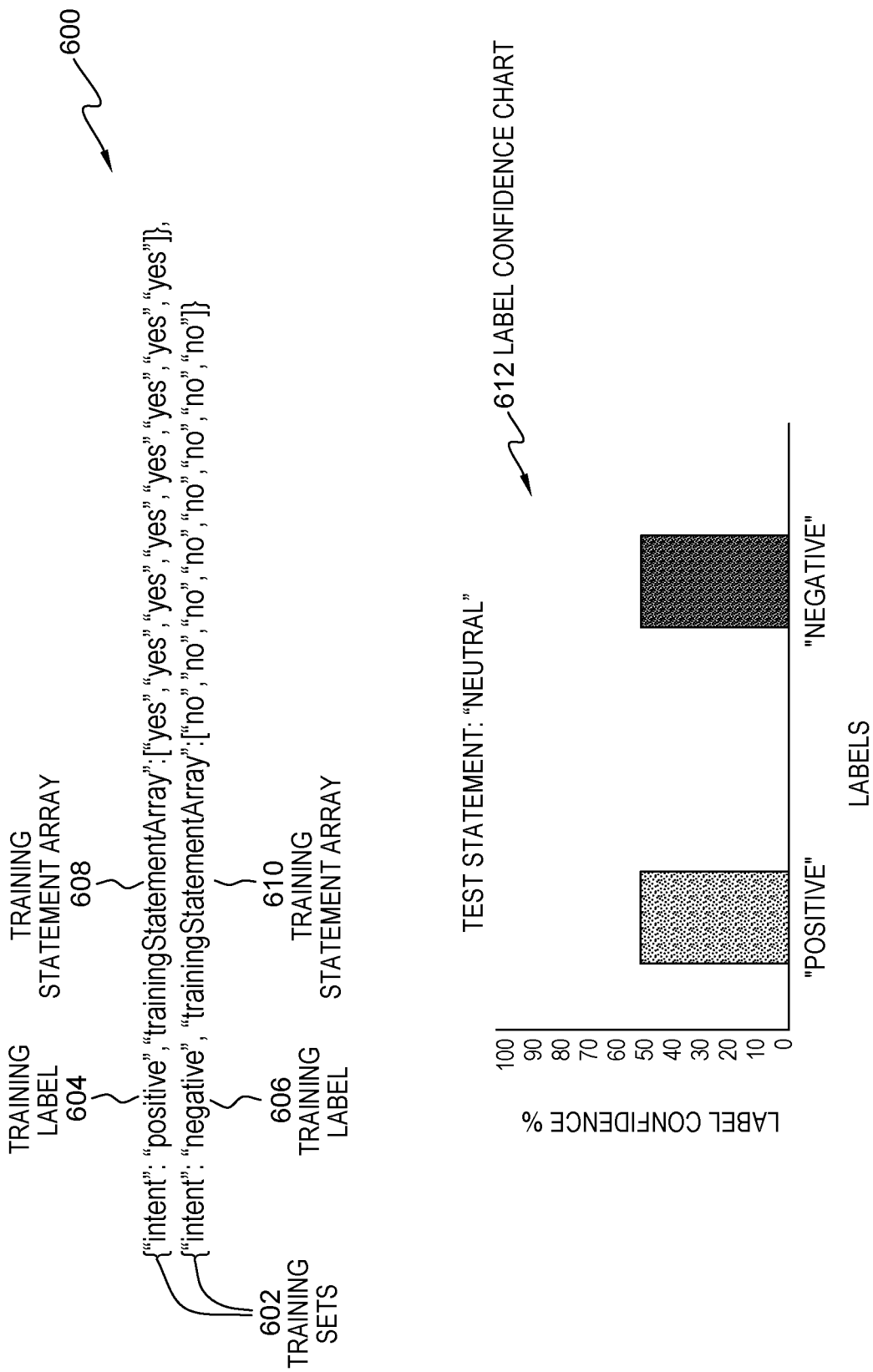
FIG. 6 is an example embodiment of the steps of flowchart 200, in accordance with an embodiment of the present invention.

In various embodiments, program 150 non-deterministically selects a training statement contained within the largest training set (i.e., the set with the largest total of training statements). For example, continuing from the above example, program 150 non-deterministically selects the training statement "yes". In this embodiment, program 150 creates a training set where the statement "yes" replaces all other training statements in said set. For example, the training set ["yes", "yeah", "yup", "affirmative", "certainly", "thumbsup", "ja", "ok", "good"] is copied and transformed into the training set ["yes", "yes", "yes", "yes", "yes", "yes", "yes", "yes", "yes"], as illustrated in FIG. 5. In another embodiment, program 150 non-deterministically selects a single training statement and replicates said statement utilizing the calculated global ratio as detailed in step 202. For example, for a training set including the training statement array ["no"], program 150 replicates the training statement "no" so that the total amount of training statements of said set is equal to the number of training statements in the largest available training set. In this example, program 150 creates the training set ["no", "no", "no", "no", "no", "no", "no", "no", "no"], as illustrated in FIG. 6. The disparity between the label distribution charts in FIGS. 5 and 6 demonstrate that the label distribution is affected, significantly, by the number, quantity, and amount of training statements in the training sets and not the choice or substance of the associated training statements.

In various embodiments, program 150 balances (e.g., redistributes, replicates, adds, etc.) every set, array, and collection of training statements associated with one or more training sets. In various embodiments, program 150 attaches or appends a random string of alphanumeric characters, such as a universally unique identifier (UUID) or globally unique identifier (GUID), at the end of a training statement. This embodiment is necessary when the model has constraints or restrictions that prevent repeated training statements or requires unique training statements. For example, the repeated training statements ["yes", "yes", "yes", "yes", "yes", "yes", "yes", "yes", "yes"] are modified as the following set ["ce6fa323 yes", "eac8f80c yes", "c0029266 yes", "c0014109 yes", "44401131 yes", "4ed62545 yes", "cb0497b9 yes", "b1361e63 yes", "a57e04d6 yes"]. Program 150 can store the original training sets and the created, generated, and/or balanced training sets into database 122.

Program 150 trains cognitive models (step 206). Program 150 utilizes the original non-modified detected, received, or retrieved training sets, detailed in step 202, generated balanced training sets, detailed in step 204, and trains one or more cognitive models based on said training sets and associated training statements. In an embodiment, as program 150 trains the models, program 150 parallelly calculates and logs cognitive model statistics such as system memory utilization, central processing unit (CPU) utilization, graphics processing unit (GPU) utilization, hard drive utilization, and total training duration. In an embodiment, program 150 utilizes one-hot encoding techniques to vectorize categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an feature set consisting of [positive, neutral, negative], program 150 encodes said corresponding feature set into the array containing [[1,0,0], [0,1,0], [0,0,1]]. In one embodiment, program 150 utilizes featuring scaling techniques (e.g., rescaling, mean normalization, etc.) to vectorize and normalize numerical feature sets. Program 150 can train cognitive model 128 by feeding the processed, feature vectors into cognitive model 128. In an embodiment, program 150 trains cognitive model 128 with a plurality of feature vectors originating from the sets extracted from the training sets and associated training statements located in training corpus 124. In an additional embodiment, program 150 stores every trained model and associated data in database 122.

Program 150 calculates the predictive accuracy of the trained cognitive models (step 208). Program 150 can utilize one or more testing statements to calculate the predictive accuracy, label certainty values and distributions for each training set. Responsive to one or more trained models, program 150 feeds one or more testing statements into said trained models, to determine predictive accuracy. In an embodiment, program 150 runs a plurality of model assessments including, but not limited to, model fit assessments, k-fold cross validation, mean bias error, modified Nash-Sutcliffe efficiency, root mean square error, and correlation coefficient. In an embodiment, program 150 may prompt and receive user feedback through a graphical user interface (not depicted) on a client computing device (not depicted). For example, the user can provide feedback for a classified testing statement. In various embodiments, user feedback may include a simple positive or negative response. In these embodiments, program 150 may use one or more NLP techniques to determine whether the response of the user is positive or negative. In another embodiment, feedback may include a user score or numerical value representing user confidence in the classification. For example, if program 150 incorrectly classifies a testing statement, the user can provide negative feedback and provide an accurate classification. The feedback may include user indications or markers regarding what portions of the generated rule were correct or incorrect. Program 150 may adjust corresponding weights in order to rectify the model and conform to the feedback.

Program 150 initiates said assessments and tests to determine the model performance (e.g., accuracy, precision, memory utilized, time constraints, etc.) of the one or more models (e.g., Naïve Bayes, etc.). In an embodiment, program 150 utilizes model fit assessments to calculate descriptive model statistics such as actual/expected classification/values, cumulative sum, and sign testing. In various embodiments, dependent on the model, program 150 utilizes k-fold cross validation to calculate a fitness measure as an estimate of model prediction performance. In an embodiment, program 150 partitions the training sets into k sized training subsets. Of the k subsets, program 150 retains a single subset, the testing set, and the remaining k−1 subsets are used as training data. Program 150 then repeats the cross-testing process k times, with each of the k subsets used exactly once as a testing set. Program 150 averages the k results to produce a single estimation of prediction performance. In this embodiment, program 150 utilizes the multiple estimations of prediction performance to generate a generalized fitness measure of the model.

Figure 4:
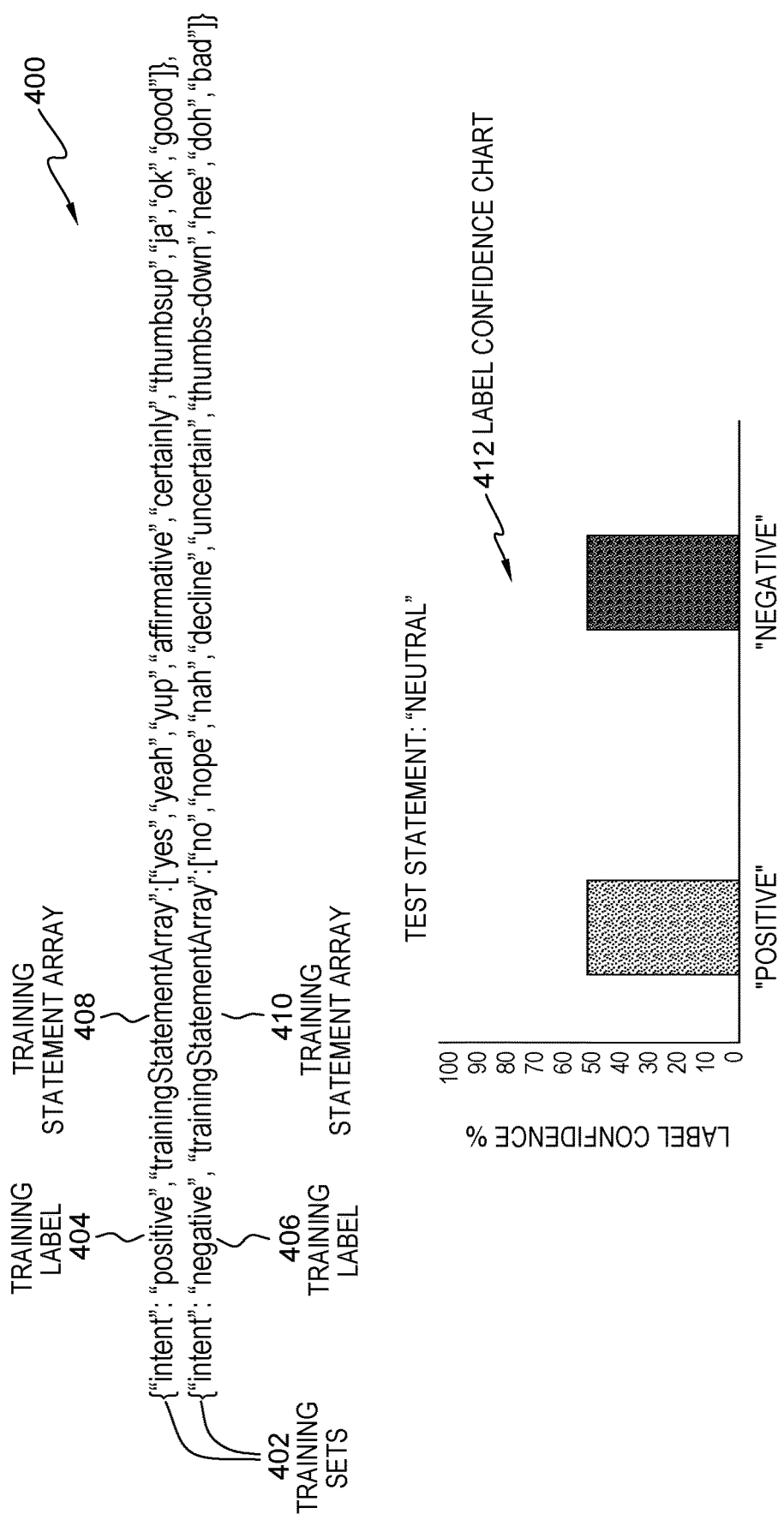
FIG. 4 is an example embodiment of the steps of flowchart 200, in accordance with an embodiment of the present invention.

In an embodiment, program 150 utilizes one or more assessments to create one or more label certainty distributions denoting the level of label confidence (e.g., predictive accuracy or performance) determined with respect to one or more testing statement classifications (e.g., label classifications). Examples of label confidence distributions are depicted and detailed in FIGS. 3-8. As illustrated in FIG. 3, where the associated training sets have not been balanced, program 150 tests the trained model with a test statement associated with an expected label, result, or prediction distribution (e.g., expected label/classification distributions, etc.), here, said test statement contains the term "neutral". In this example, the trained model is expected to classify the word "neutral" equally between the two labels, "positive" and "negative". FIG. 3 demonstrates that the test statement is four times as likely to be classified as a "positive" label rather than classified equally (e.g., 50% and 50%) between "positive" and "negative" labels. FIG. 4 depicts an example label distribution chart that comports with the expected label distribution and represents the distribution obtained when the training statements are balanced.

Program 150 can create historical trend regression models allowing the tracking of historical model accuracy and prediction performance metrics. In an embodiment, program 150 maintains multiple historical trend regression models for each calculated prediction performance metric. In a further embodiment, program 150 logs and maintains records for each prediction performance metric for each model training and testing iteration. In this embodiment, program 150 maintains a copy of the cognitive model for each model iteration (e.g., model training, insertion, or deletion to training and testing sets), allowing comparisons of historical cognitive models. In various embodiments, program 150 constructs and maintains separate historical trend regression models for each calculated prediction performance metric.

Program 150 determines the fitness of the trained cognitive models (step 210). Program 150 utilizes one or more assessments, tests, prediction performance metrics, and label certainty distributions, as discussed above, to determine the fitness (e.g., predictive accuracy, level of bias, error rates (i.e., Bayes error rate) etc.) of the model. In an embodiment, program 150 utilizes the prediction performance metrics and label certainty distributions of the trained models utilizing the unmodified (e.g., original) training sets (e.g., FIG. 3). In this embodiment, program 150 establishes said metrics and distributions from unmodified training sets as baselines or thresholds. For example, if program 150 determines that the model, utilizing an unmodified training set, has a predictive accuracy (e.g., likelihood of correctly classifying a statement) of 75%, then program 150 sets a predictive accuracy threshold at 75%. In this example, all subsequent models are considered not well-trained if said models do not exceed said threshold. In another embodiment, program 150 determines the fitness of the model based on pre-determined or user specified thresholds. For example, the user may specify that a not well-trained model consists of a model that has a predictive accuracy less than 0.7 or 70% or in the alternative, a well-trained model is a model that has a predictive accuracy greater than or equal to 0.7 or 70%.

Figure 7:
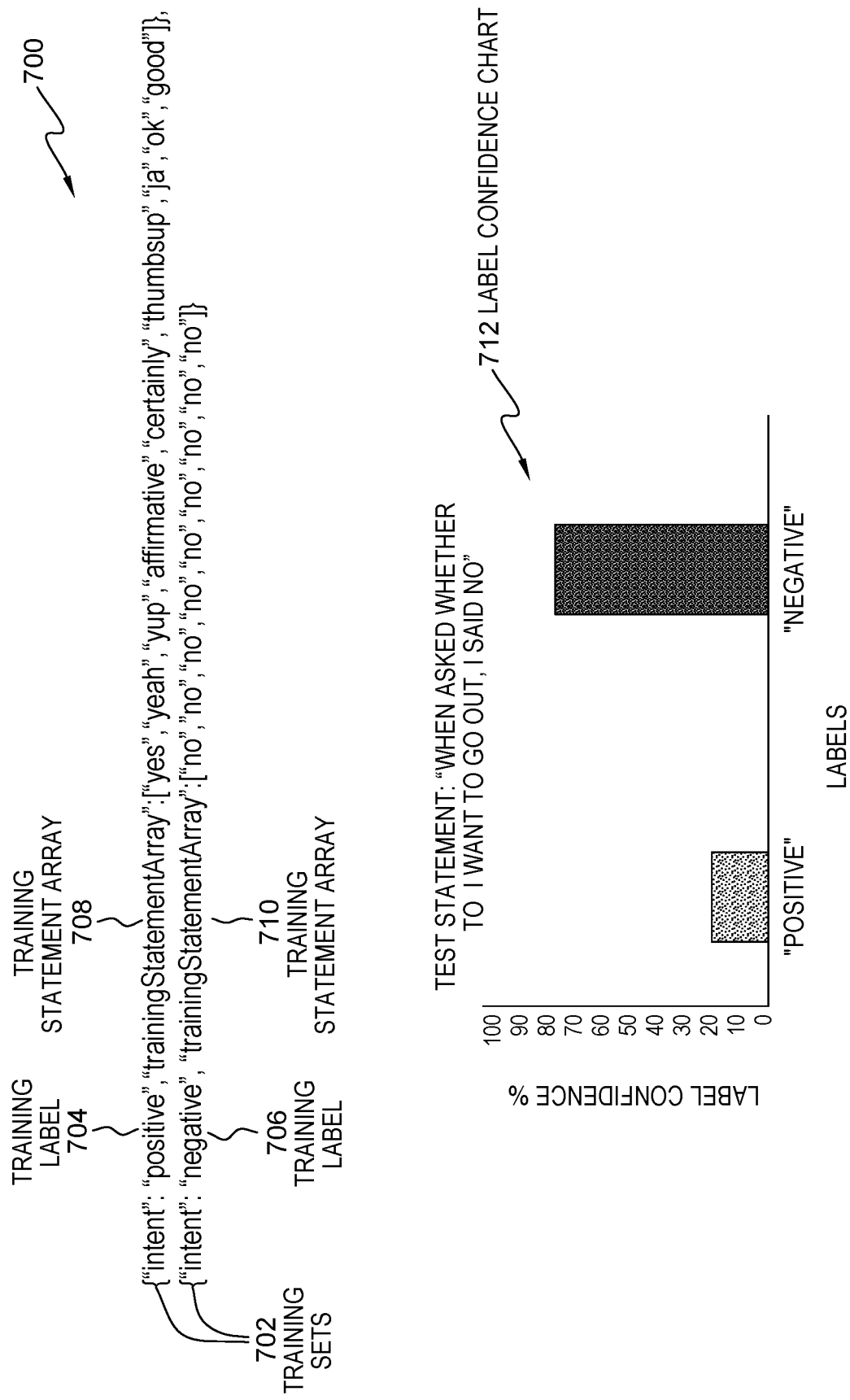
FIG. 7 is an example embodiment of the steps of flowchart 200, in accordance with an embodiment of the present invention.
Figure 8:
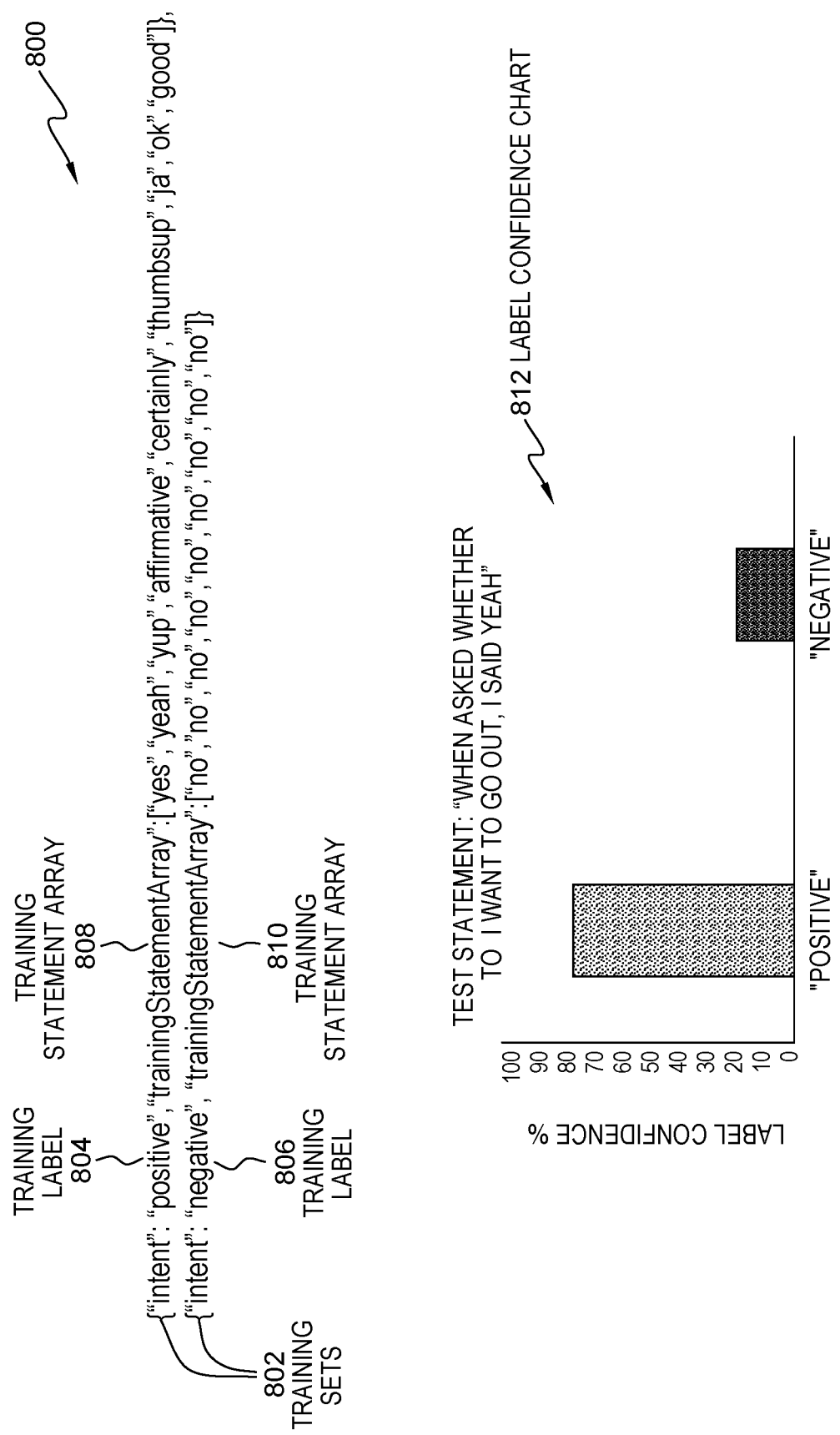
FIG. 8 is an example embodiment of the steps of flowchart 200, in accordance with an embodiment of the present invention.

Program 150 can determine whether prediction performance metrics are influenced by training statement imbalances or distribution biases utilizing the tests, assessments, and label distributions detailed in step 208. In an embodiment, program 150 utilizes the expected label distributions of one or more test sets and associated test statements to determine training statement imbalances in training sets. In this embodiment, test sets include expected prediction performance metrics and label distributions. For example, in FIGS. 4 and 6, label confidence charts 412/612 illustrate the expected label confidence percentages for the specified test statement, "neutral", and training sets 402/602, respectively. In FIGS. 4 and 6, the training sets have an equal number of repeated training statements. In FIGS. 3 and 5, label confidence charts 312/512 illustrate the actual label confidence percentages for the specified test statement, "neutral", and training sets 302/502, respectively. In FIGS. 3 and 5, the associated training sets have an unbalanced number of training statements. Continuing from the aforementioned example and Figures, program 150 determines that the trained model in FIG. 3, the unmodified training set, has an incorrect label distribution due to training statement imbalances and thus the model is not well-trained. In another example, the models in FIGS. 7 and 8 are determined to meet the expected label distribution and thus the models are well-trained. In another embodiment, program 150 utilizes a dynamic threshold based on one or more label certainty distributions of one or more balanced training and testing sets, as detailed in step 204. In this embodiment, program 150 aggregates the expected and actual predication performance metrics to generate a threshold label distribution, where the threshold label distributions include expected probabilities and percentages every given label (e.g., class, feature, etc.).

Program 150 logs trained cognitive models (step 212). In various embodiments, program 150 stores the trained models, associated training sets, training statements, calculated performance metrics, and distributions into database 122. In an embodiment, program 150 stores associated training statistics and prediction performance metrics. In another embodiment, program logs and stores every iteration and subset of each training set along with the associated statistics and the trained cognitive model. In various embodiments, program 150 utilizes the calculated predictive accuracy, predication performance metrics, and label distributions, detailed above, to rank all associated trained models including the unmodified (e.g., original) model, testing models, and balanced training and testing models. In an embodiment, program 150 transmits the highest ranked model or training set to the user or external system, method, procedure, or entity. In yet another embodiment, program 150 selects the highest ranked trained model and applies one or more input sets (e.g., sets that have no target, expected output and/or label). For example, if the purpose of the trained model is to determine the likelihood that a given statement is positive or negative, as illustrated in FIGS. 3-8, then program 150 selects the highest ranked trained model, inputs one or more statements, and determines the respective probabilities that the inputted statements are either positive or negative.

FIG. 3 depicts an example embodiment of the steps of flowchart 200 including training sets 302, one or more training sets, training label 304, a "positive" label or class, training label 306, a "negative" label or class, training statement array 308, an array containing one or more training statements associated with the label, training statement array 310, an array containing one or more training statements associated with the label, label confidence chart 312, a chart denoting the label confidence values for each label associated training sets. FIG. 3 depicts a cognitive model trained utilizing unmodified (e.g., original) training sets and associated label confidence chart.

FIG. 4 depicts an example embodiment of the steps of flowchart 200 including training sets 402, one or more training sets, training label 404, a "positive" label or class, training label 406, a "negative" label or class, training statement array 408, an array containing one or more training statements associated with the label, training statement array 410, an array containing one or more training statements associated with the label, label confidence chart 412, a chart denoting the label confidence values for each label associated training sets. FIG. 4 depicts a cognitive model trained utilizing a complete, non-repeating but balanced training sets and associated label confidence chart.

FIG. 5 depicts an example embodiment of the steps of flowchart 200 including training sets 502, one or more training sets, training label 504, a "positive" label or class, training label 506, a "negative" label or class, training statement array 508, an array containing one or more training statements associated with the label, training statement array 510, an array containing one or more training statements associated with the label, label confidence chart 512, a chart denoting the label confidence values for each label associated training sets. FIG. 5 depicts a cognitive model trained utilizing modified, unbalanced but repeating training sets and an associated label confidence chart.

FIG. 6 depicts an example embodiment of the steps of flowchart 200 including training sets 602, one or more training sets, training label 604, a "positive" label or class, training label 606, a "negative" label or class, training statement array 608, an array containing one or more training statements associated with the label, training statement array 610, an array containing one or more training statements associated with the label, label confidence chart 612, a chart denoting the label confidence values for each label associated training sets. FIG. 6 depicts a cognitive model trained utilizing modified, balanced, and repeating training sets and an associated label confidence chart.

FIG. 7 depicts an example embodiment of the steps of flowchart 200 including training sets 702, one or more training sets, training label 704, a "positive" label or class, training label 706, a "negative" label or class, training statement array 708, an array containing one or more training statements associated with the label, training statement array 710, an array containing one or more training statements associated with the label, label confidence chart 712, a chart denoting the label confidence values for each label associated training sets. FIG. 7 depicts a cognitive model trained utilizing an unmodified (e.g., original) training set, a modified, repeating, balanced training set, and an associated label confidence chart.

FIG. 8 depicts an example embodiment of the steps of flowchart 200 including training sets 802, one or more training sets, training label 804, a "positive" label or class, training label 806, a "negative" label or class, training statement array 808, an array containing one or more training statements associated with the label, training statement array 810, an array containing one or more training statements associated with the label, label confidence chart 812, a chart denoting the label confidence values for each label associated training sets. FIG. 8 depicts a cognitive model trained utilizing an unmodified (e.g., original) training set, a modified, repeating, balanced training set, and an associated label confidence chart.

Figure 9:
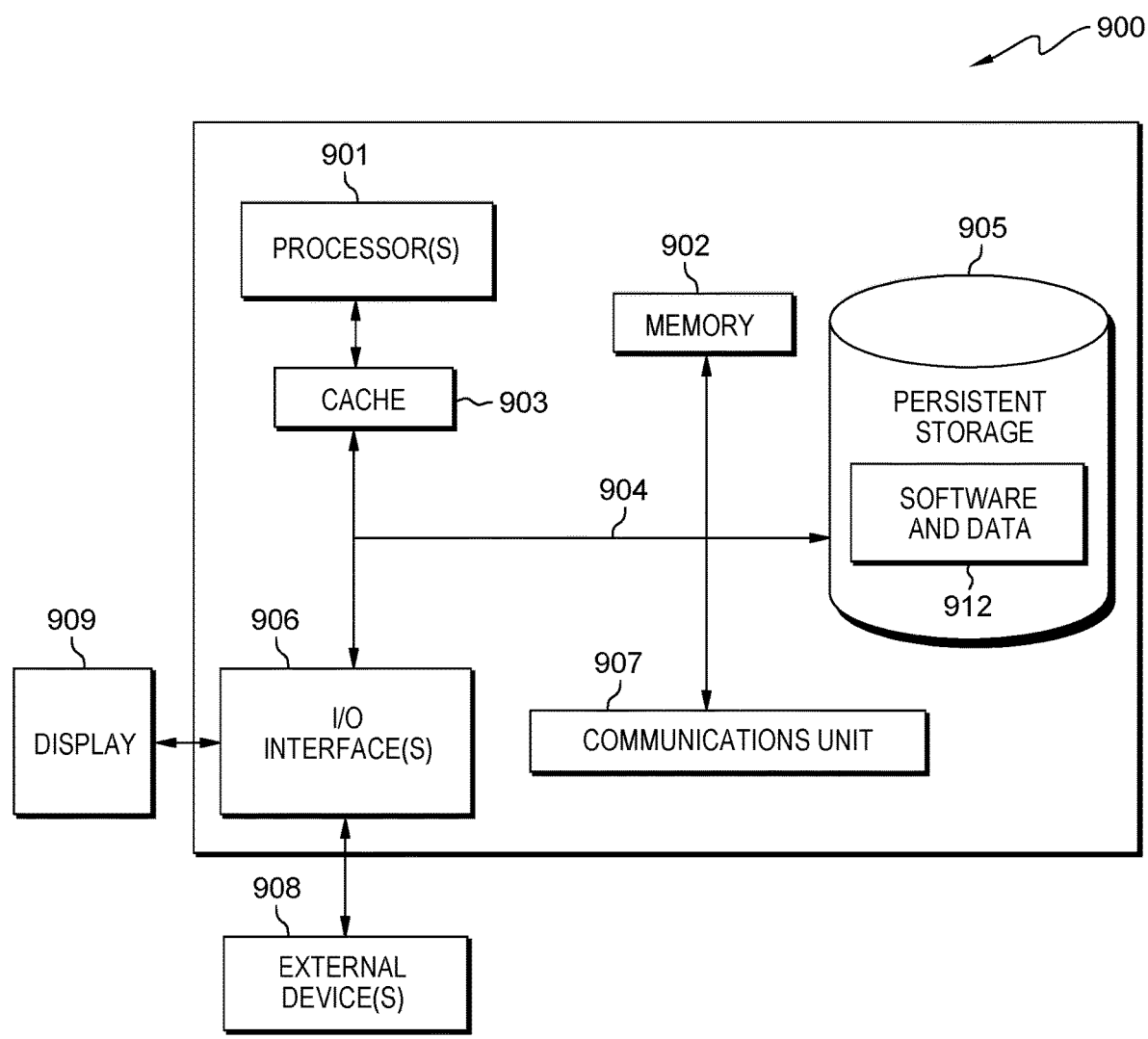
FIG. 9 is a block diagram of components of the server computer executing the training statement balancing program, in accordance with an embodiment of the present invention.

FIG. 9 depicts a block diagram of components of server computer 120 in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Server computer 120 includes communications fabric 904, which provides communications between cache 903, memory 902, persistent storage 905, communications unit 907, and input/output (110) interface(s) 906. Communications fabric 904 can be implemented with any architecture designed for passing data and/or control information between processors (such as microprocessors, communications, and network processors, etc.), system memory, peripheral devices, and any other hardware components within a system. For example, communications fabric 904 can be implemented with one or more buses or a crossbar switch.

Memory 902 and persistent storage 905 are computer readable storage media. In this embodiment, memory 902 includes random access memory (RAM). In general, memory 902 can include any suitable volatile or non-volatile computer readable storage media. Cache 903 is a fast memory that enhances the performance of computer processor(s) 901 by holding recently accessed data, and data near accessed data, from memory 902.

Program 150 may be stored in persistent storage 905 and in memory 902 for execution by one or more of the respective computer processor(s) 901 via cache 903. In an embodiment, persistent storage 905 includes a magnetic hard disk drive. Alternatively, or in addition to a magnetic hard disk drive, persistent storage 905 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 905 may also be removable. For example, a removable hard drive may be used for persistent storage 905. Other examples include optical and magnetic disks, thumb drives, and smart cards that are inserted into a drive for transfer onto another computer readable storage medium that is also part of persistent storage 905. Software and data 912 can be stored in persistent storage 905 for access and/or execution by one or more of the respective processors 901 via cache 903.

Communications unit 907, in these examples, provides for communications with other data processing systems or devices. In these examples, communications unit 907 includes one or more network interface cards. Communications unit 907 may provide communications through the use of either or both physical and wireless communications links. Program 150 may be downloaded to persistent storage 905 through communications unit 407.

I/O interface(s) 906 allows for input and output of data with other devices that may be connected to a client computing device (not depicted) or server computer 120. For example, I/O interface(s) 906 may provide a connection to external device(s) 908, such as a keyboard, a keypad, a touch screen, and/or some other suitable input device. External devices 908 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 905 via I/O interface(s) 906. I/O interface(s) 906 also connect to a display 909.

Display 909 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, quantum programming languages such as the "Q", Q#, quantum computation language (QCL) or similar programming languages, low-level programming languages, such as the assembly language or similar programming languages, and generic macros. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    calculating, by one or more computer processors, one or more training set statistics;
    generating, by one or more computer processors, one or more balanced training sets based on one or more calculated training set statistics;
    training, by one or more computer processors, one or more cognitive models utilizing one or more unbalanced training sets and one or more generated balanced training sets;
    determining, by one or more computer processors, a fitness of the one or more trained cognitive models comprising:
        calculating, by one or more computer processors, a predictive accuracy for each trained cognitive model;
        outputting, by one or more computer processors, one or more computed results or utilizing a highest predictive accuracy cognitive model inputted with non-labelled inputs; and
    adjusting, by one or more computer processors, one or more training sets based on the determined fitness of the one or more cognitive models.

2. The method of claim 1, wherein calculating one or more training set statistics, further comprises:
    retrieving, by one or more computer processors, one or more training sets, wherein the training sets contain a label and one or more associated training statements;
    calculating, by one or more computer processors, a total number of training statements for one or more labels; and
    determining, by one or more computer processors, a lowest common multiple for the one or more labels.

3. The method of claim 2, wherein generating one or more balanced training sets, further comprises:
    iterating, by one or more computer processors, through each training set;
    selecting, by one or more computer processors, non-deterministically, a training statement associated with each training label; and
    replicating, by one or more computer processors, the selected training statement based on the determined lowest common multiple.

4. The method of claim 3, further comprises:
    generating, by one or computer processors, a universally unique identifier; and
    appending, by one or more computer processors, the generated universally unique identifier to the training statement.

5. The method of claim 1, wherein determining the fitness of the trained cognitive models, further comprises:
    calculating, by one or more computer processors, a predictive accuracy of the trained cognitive models; and
    ranking, by one or more computer processors, the trained cognitive models based on the calculated predictive accuracy.

6. The method of claim 5, further comprises:

selecting, by one or more computer processors, the highest ranked trained cognitive model;

inputting, by one or more computer processors, one or more non-labelled inputs into the selected trained cognitive model; and outputting, by one or more computer processors, one or more computed results utilizing the selected trained cognitive model.

7. The method of claim 1, wherein the cognitive models are natural language classifiers.

8. The method of claim 7, wherein the natural language classifiers are Nave Bayes classifiers.

9. The method of claim 1, further comprises:

logging, by one or more computer processors, the one or more trained cognitive models; and logging, by one or more computer processors, associated training labels and training statements.

10. A computer program product comprising:

one or more computer readable storage media and program instructions stored on the one or more computer readable storage media, the stored program instructions comprising:

program instructions to calculate one or more training set statistics;

program instructions to generate one or more balanced training sets based on one or more calculated training set statistics;

program instructions to train one or more cognitive models utilizing one or more unbalanced training sets and one or more generated balanced training sets;

program instructions to determine a fitness of the one or more trained cognitive models comprising:

program instructions to calculate a predictive accuracy for each trained cognitive model;

program instructions to output one or more computed results or utilizing a highest predictive accuracy cognitive model inputted with non-labelled inputs; and program instructions to adjust one or more training sets based on the determined fitness of the one or more cognitive models.

11. The computer program product of claim 10, wherein calculating one or more training set statistics, further comprises:

program instructions to retrieve one or more training sets, wherein the training sets contain a label and one or more associated training statements;

program instructions to calculate a total number of training statements for one or more labels; and program instructions to determine a lowest common multiple for the one or more labels.

12. The computer program product of claim 11, wherein generating one or more balanced training sets, further comprises:

program instructions to iterate, through each training set;

program instructions to select non-deterministically, a training statement associated with each training label; and program instructions to replicate the selected training statement based on the determined lowest common multiple.

13. The computer program product of claim 10, wherein determining the fitness of the trained cognitive models, further comprises:

program instructions to calculate a predictive accuracy of the trained cognitive models; and program instructions to rank the trained cognitive models based on the calculated predictive accuracy.

14. The computer program product of claim 13, further comprises:

program instructions to select the highest ranked trained cognitive model;

program instructions to input one or more non-labelled inputs into the selected trained cognitive model; and program instructions to output one or more computed results utilizing the selected trained cognitive model.

15. The computer program product of claim 10, wherein the cognitive models are natural language classifiers.

16. A computer system comprising:

one or more computer processors;

one or more computer readable storage media; and program instructions stored on the computer readable storage media for execution by at least one of the one or more processors, the stored program instructions comprising:

program instructions to calculate one or more training set statistics;

program instructions to generate one or more balanced training sets based on one or more calculated training set statistics;

program instructions to train one or more cognitive models utilizing one or more unbalanced training sets and one or more generated balanced training sets;

program instructions to determine a fitness of the one or more trained cognitive models comprising:

program instructions to calculate a predictive accuracy for each trained cognitive model;

program instructions to output one or more computed results or utilizing a highest predictive accuracy cognitive model inputted with non-labelled inputs; and program instructions to adjust one or more training sets based on the determined fitness of the one or more cognitive models.

17. The computer system of claim 16, wherein calculating one or more training set statistics, further comprises:

program instructions to retrieve one or more training sets, wherein the training sets contain a label and one or more associated training statements;

program instructions to calculate a total number of training statements for one or more labels; and program instructions to determine a lowest common multiple for the one or more labels.

18. The computer system of claim 17, wherein generating one or more balanced training sets, further comprises:

program instructions to iterate, through each training set;

program instructions to select non-deterministically, a training statement associated with each training label; and program instructions to replicate the selected training statement based on the determined lowest common multiple.

19. The computer system of claim 16, wherein determining the fitness of the trained cognitive models, further comprises:

program instructions to calculate a predictive accuracy of the trained cognitive models; and program instructions to rank the trained cognitive models based on the calculated predictive accuracy.

20. The computer system of claim 19, further comprises:

program instructions to select the highest ranked trained cognitive model;

program instructions to input one or more non-labelled inputs into the selected trained cognitive model; and
program instructions to output one or more computed results utilizing the selected trained cognitive model.

\* \* \* \* \*